United States Patent
Dennison (10) Patent No.: US 10,976,974 B1
(45) Date of Patent: Apr. 13, 2021

(54) DEFECT SIZE DETECTION MECHANISM

(71) Applicant: Carl Michael Dennison, Longmont, CO (US)

(72) Inventor: Carl Michael Dennison, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/724,490

(22) Filed: Dec. 23, 2019

(51) Int. Cl.
*G06F 3/12* (2006.01)

(52) U.S. Cl.
CPC .......... *G06F 3/1242* (2013.01); *G06F 3/1208* (2013.01)

(58) Field of Classification Search
None
See application file for complete search history.

(56) References Cited

U.S. PATENT DOCUMENTS

| | | | |
|---|---|---|---|
| 6,968,076 B1 | 11/2005 | Ou Yang et al. | |
| 7,519,222 B2 | 4/2009 | Kisilev et al. | |
| 7,646,908 B2 | 1/2010 | Onishi | |
| 8,472,073 B2 | 6/2013 | Dennison | |
| 8,654,369 B2 | 2/2014 | Kogan | |
| 8,831,381 B2 | 9/2014 | Baheti et al. | |
| 8,867,796 B2 | 10/2014 | Vans et al. | |
| 9,077,927 B2 | 7/2015 | Miyagawa et al. | |
| 9,524,545 B2 | 12/2016 | Fukase | |
| 2004/0155916 A1* | 8/2004 | Uchiyama | H04N 1/405 347/15 |
| 2008/0260395 A1 | 10/2008 | Honma | |
| 2011/0149331 A1 | 6/2011 | Duggan et al. | |
| 2015/0078627 A1* | 3/2015 | Fukase | G06T 7/001 382/112 |
| 2019/0102270 A1 | 4/2019 | Dennison | |

FOREIGN PATENT DOCUMENTS

DE 102016204506 A1 10/2016

OTHER PUBLICATIONS

Yangping, W. et al. (Jan. 2018). Real-time defect detection method for printed images based on grayscale and gradient differences. Journal of Engineering Science and Technology Review 11(1), 180-188.
Online sheet-fed inspection system. (May 2019). DAC Engineering. Retrieved from http://www.dac-eng.co.jp/eng/products/online.html:.

* cited by examiner

*Primary Examiner* — Lennin R Rodriguezgonzalez
*Assistant Examiner* — Lennin R Rodriguez
(74) *Attorney, Agent, or Firm* — Jaffery Watson Mendonsa & Hamilton LLP (57) ABSTRACT

A system is disclosed. The system includes a print controller including one or more processors to receive print data, rasterize the print data into bitmap data, analyze objects in each page of bitmap data to determine sizes of objects and generate mapping data for each page of bitmap data that maps locations of page bitmap data having same size objects, a print engine to print the bitmap data to a medium and a print verification system to capture one or more images of the medium as print verification data and to detect one or more defects in the print verification data.

17 Claims, 8 Drawing Sheets

Figure 7

DEFECT SIZE DETECTION MECHANISM

FIELD OF THE INVENTION

The invention relates to the field of printing systems, and in particular, to image processing in a printing system.

BACKGROUND

High speed print production systems often implement a print verification system (PVS) to detect defects in print data applied to a medium (e.g., paper). Current PVSs implement a manual setting to adjust a defect size sensitivity (DSS) by setting a minimum defect size (MDS) in which defects that are smaller than the MDS are not reported. However, defects at or above the MDS are reported and must be reviewed by Quality Assurances (QA) operators (or reviewers).

QA operators determine whether or not the reported defects impact the readability of the text in the printed documents. The size of the text affects whether a small defect is significant. For example, a small defect on small print can completely obliterate a character whereas the same defect on very large text has no impact at all. Since the MDS setting does not take into account the size of the text where the defect is reported, QA operators invariably spend much of their time reviewing insignificant defects.

Accordingly, an improved defect detection mechanism is desired.

SUMMARY

In one embodiment, a system includes a print controller including one or more processors to receive print data, rasterize the print data into bitmap data, analyze objects in each page of bitmap data to determine sizes of objects and generate mapping data for each page of bitmap data that maps locations of page bitmap data having same size objects, a print engine to print the bitmap data to a medium and a print verification system to capture one or more images of the medium as print verification data and to detect one or more defects in the print verification data.

BRIEF DESCRIPTION OF THE DRAWINGS

A better understanding of the present invention can be obtained from the following detailed description in conjunction with the following drawings, in which.

DETAILED DESCRIPTION

A mechanism to detect defect sizes in a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
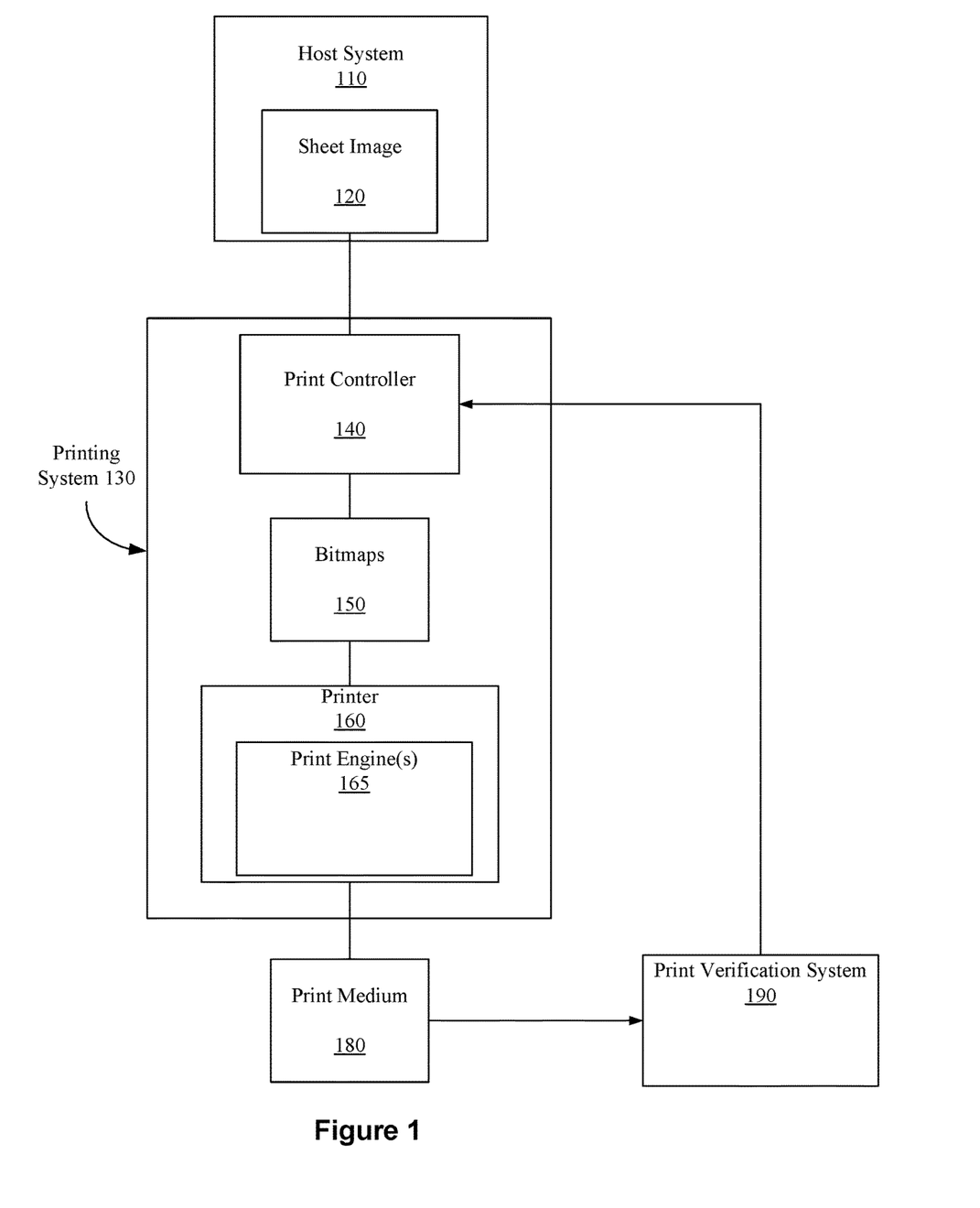
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines 165 to present the bitmap 150 onto the print medium 180 via marking material (e.g., toner, ink, coatings, etc.) based on the sheet image 120.

Print controller 140 and printer 160 may be both implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

In one embodiment, print verification system (PVS) 190 is implemented to record print quality defects on the substrate, as well as record mechanical defects in the substrate during printing (e.g., flutter, cockle, wrinkles or z-direction defects). In one embodiment, PVS 190 may report results of any detected defects to print controller 140 for further processing. PVS 190 may be a stand-alone component or may be integrated into the printing system 130.

Figure 2:
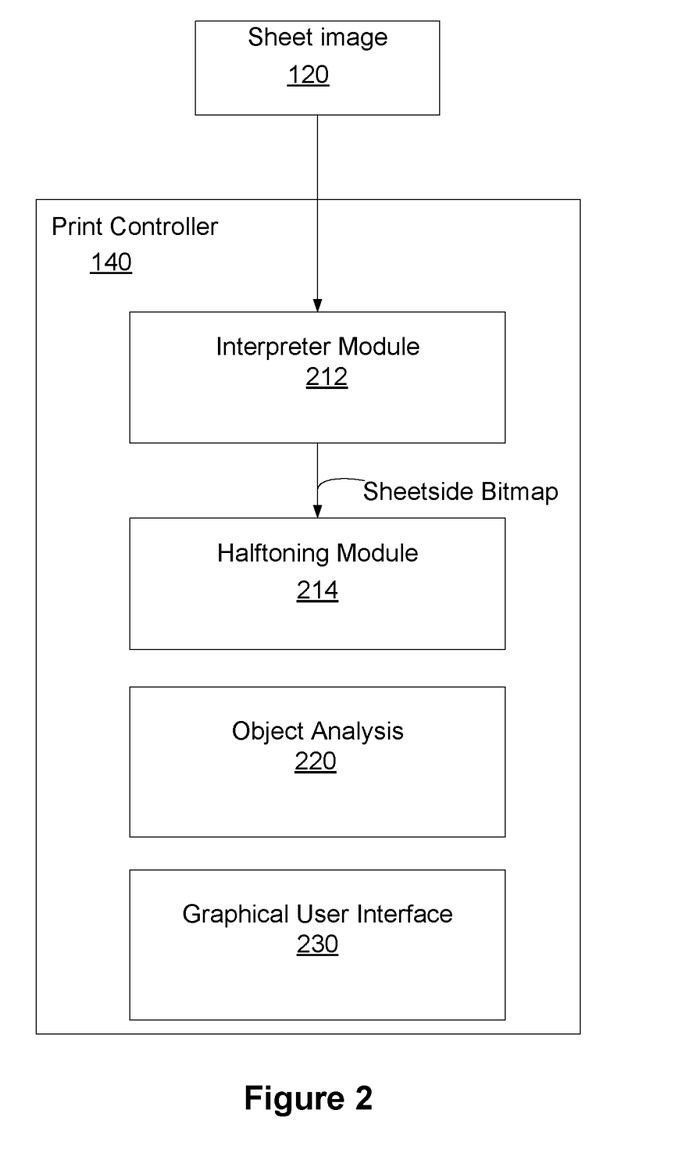
FIG. 2 is a block diagram illustrating one embodiment of a print controller.

FIG. 2 illustrates one embodiment of a print controller 140. As shown in FIG. 2, print controller 140 (e.g., DFE or digital front end), in its generalized form, includes interpreter module 212, halftoning module 214 and object analysis logic 220. Interpreter module 212 is operable to interpret, render, rasterize, or otherwise convert images (e.g., raw sheetside images such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image. In one embodiment, interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location.

According to one embodiment, object analysis logic 220 analyzes objects in each bitmap sheetside (or page) to determine the size of all objects (e.g., text font or image) on a page. In a further embodiment, locations of areas with same-size objects are mapped to generate object maps (e.g., mapping data). In one embodiment, the mapping data is generated by tracking the size of all objects (e.g., text font and objects) and blank spaces, and page coordinates at which these objects are located on a page. As a result, the locations having the same object sizes are mapped.

Figure 3A:
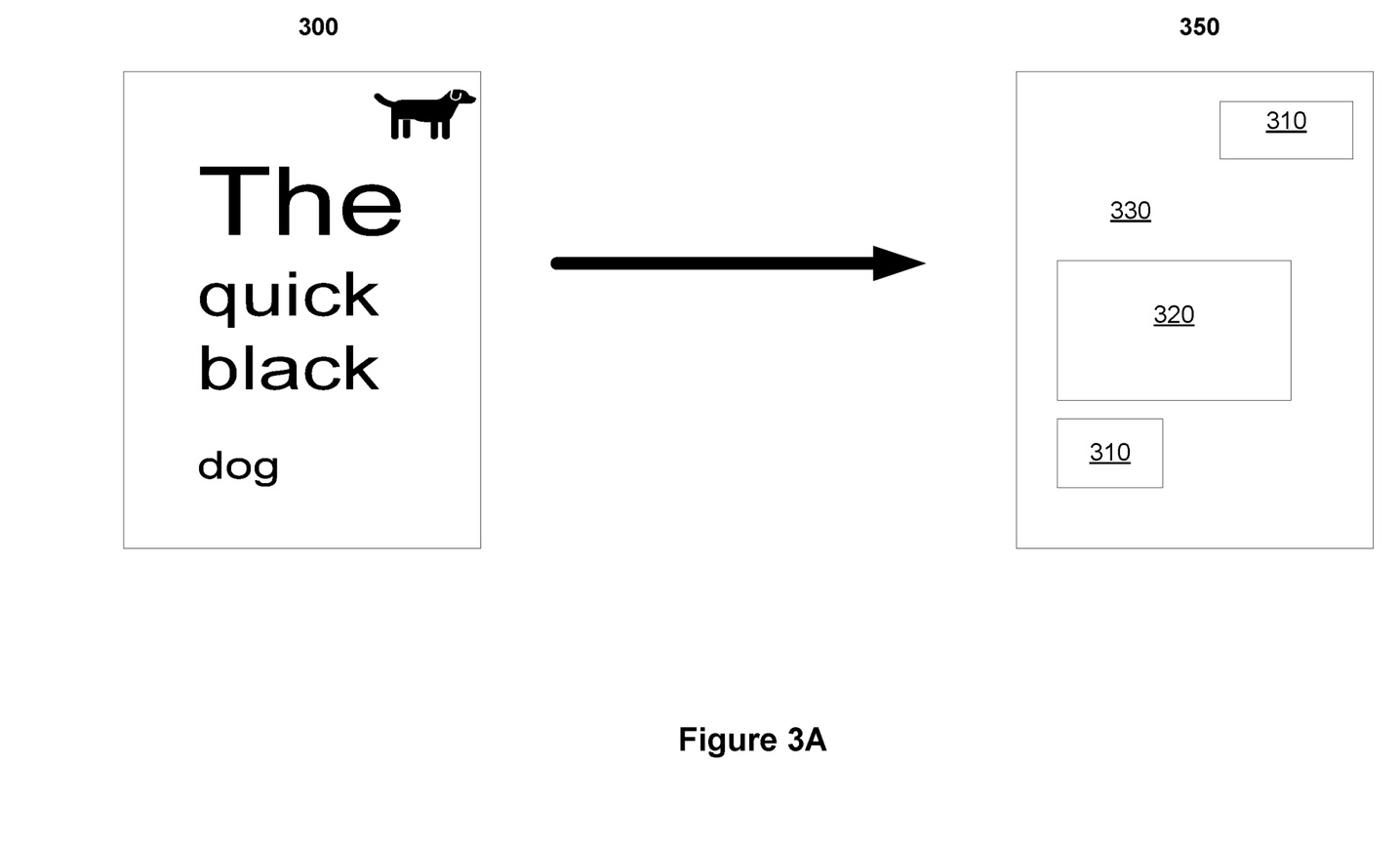
FIG. 3A illustrates one embodiment of print data.

FIG. 3A illustrates one embodiment of a page of bitmap data 300 analyzed to generate mapping data 350 of objects to one of a plurality of size regions. As shown in FIG. 3A, the mapping data 350 includes small objects (e.g., the "dog" text and dog object) that are mapped to small size regions 310 and medium objects (e.g., the "quick black" text) that are mapped to a medium size region 320. Additionally, the mapping data includes large objects (e.g., the "The" text and blank space) that are mapped to a large size region 330. Thus, minimum defect sizes may vary across the page, where regions with small objects are assigned a high sensitivity and regions with large objects and empty areas are assigned a reduced sensitivity.

In one embodiment, each region is associated with a pre-defined minimum defect size threshold. In such an embodiment, controller 140 implements a graphical user interface (GUI) 230 to define the minimum defect size threshold during administration of PVS system 190. According to one embodiment, GUI 230 may be used to define a fixed number of regions (e.g., small, medium and large), and associate object size ranges for each region. For example, the size ranges may include 0-x for small; x+1 to y for medium; and y+1 to infinity for large. In another embodiment, the minimum defect size threshold may be set as a percentage of object size using GUI 230.

Figure 4:
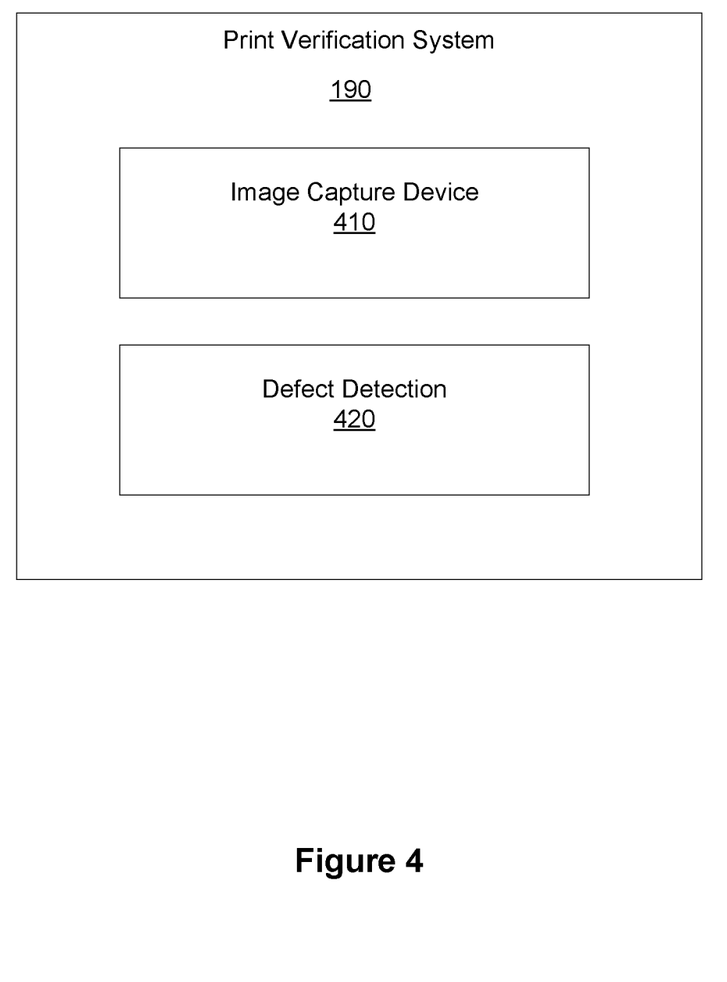
FIG. 4 illustrates one embodiment of a print verification system.

FIG. 4 illustrates one embodiment of PVS 190, including an image capture device 410 and defect detection logic 420. In one embodiment, image capture device 410 includes one or more cameras. However in other embodiments, image capture device 410 may include different types of image capture devices. In such embodiments, image capture device 410 captures (or scans) images of the print medium after the bitmap print data has been applied using the marking material.

Figure 3B:
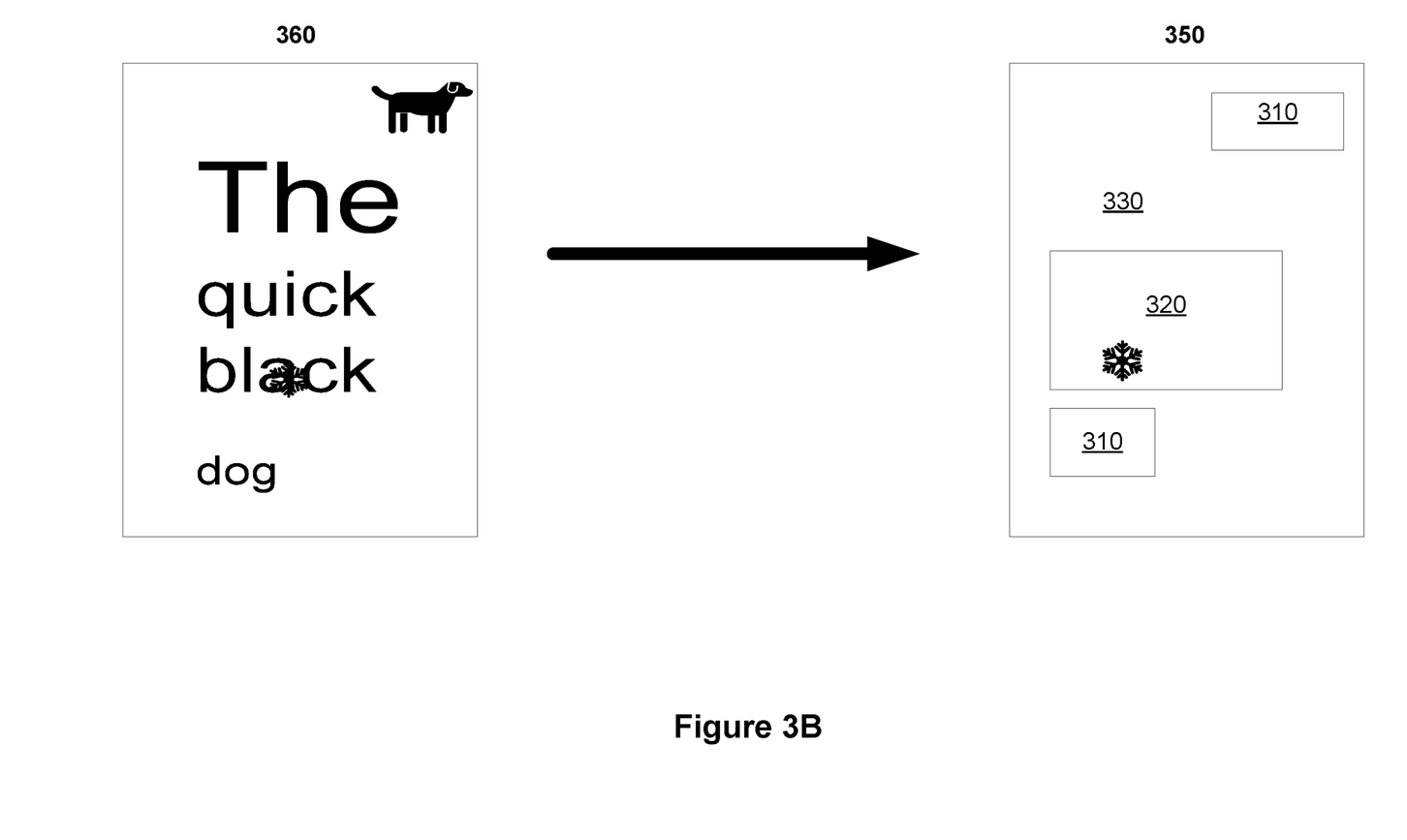
FIG. 3B illustrates one embodiment of print verification data.

According to one embodiment, defect detection logic 420 receives the resulting print verification data (e.g., print images) and analyzes the print verification data to determine whether there are any defects. FIG. 3B illustrates one embodiment of a page of print verification data 360. In a further embodiment, defect detection logic 420 performs the analysis by retrieving the page bitmap data 300 and comparing the page bitmap data 300 to the print verification data 360.

As shown in FIG. 3B, the print verification data 360 is the same as the page bitmap data 300, with the exception of including a defect character under the "a" in the word black. Upon detecting the defect, defect detection logic 420 determines the size of the defect. In one embodiment, defect detection logic 420 determines the size of the defect by retrieving mapping data 350 and determining the location of the defect (or defect location) in the mapping data 350.

Upon determining the location of the defect, defect detection logic 420 determines whether the size of the defect is greater than or equal to a minimum defect size threshold associated with that location. The defect is reported upon a determination that the defect size is greater than or equal to the minimum defect size threshold. FIG. 3B shows that the defect location is within region 320 of the mapping data 350.

Figure 5:
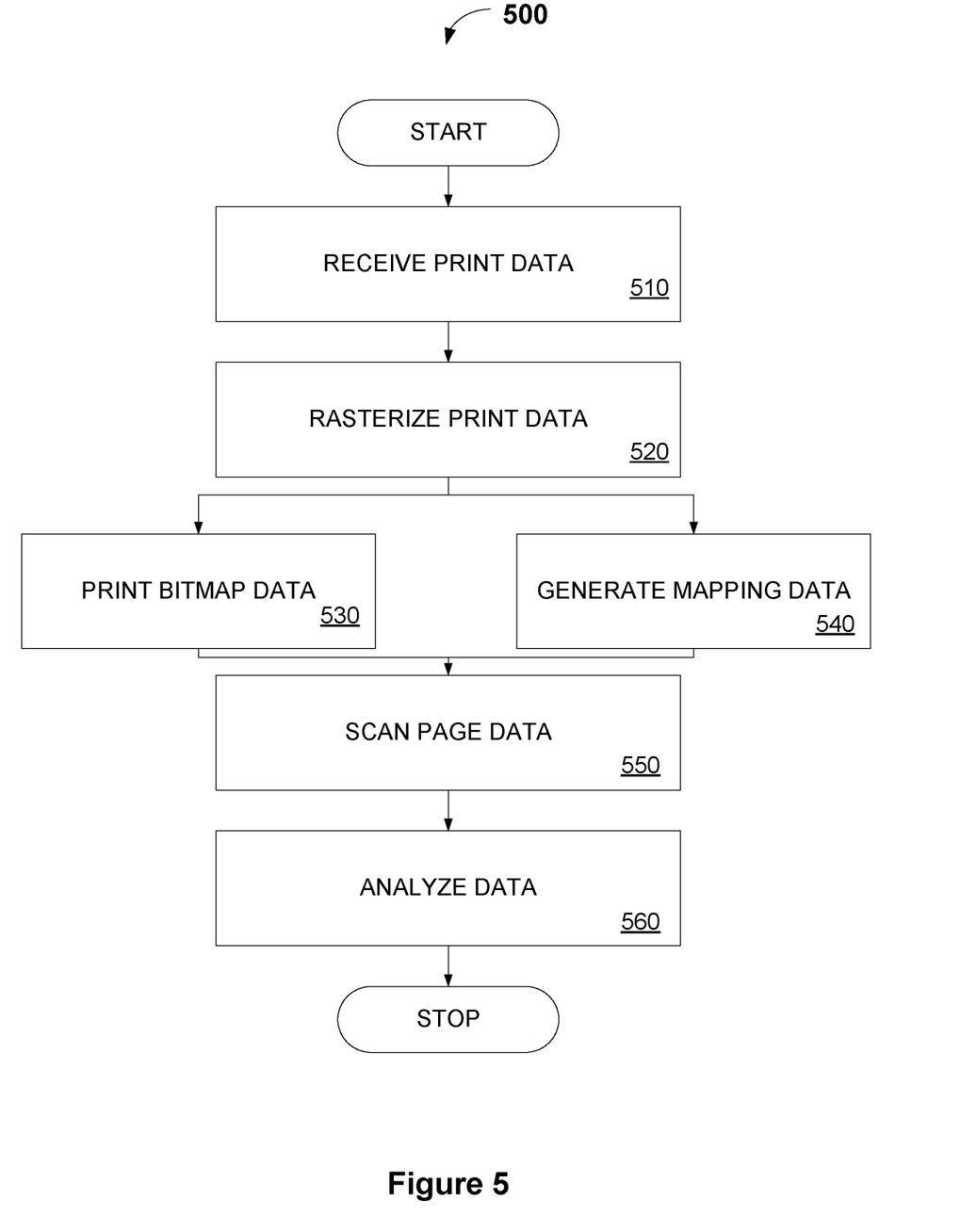
FIG. 5 is a flow diagram illustrating one embodiment of a method for processing print data.

FIG. 5 is a flow diagram illustrating one embodiment of a process 500 for processing print data. Process 500 may be performed by processing logic that may comprise hardware (e.g., circuitry, dedicated logic, programmable logic, etc.), software (such as instructions run on a processing device), or a combination thereof. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where print data is received. At processing block 510, the print data is rasterized into bitmap data. At processing block 530, the bitmap data is printed. During the printing of the bitmap data the mapping data is generated, processing block 540. Once the data bitmap data has been printed (e.g., applied to the medium), the data on each page (or page data) is scanned at print verification system to generate print verification data, processing block 550. At processing block 560, the print verification system analyzes the print verification data.

Figure 6:
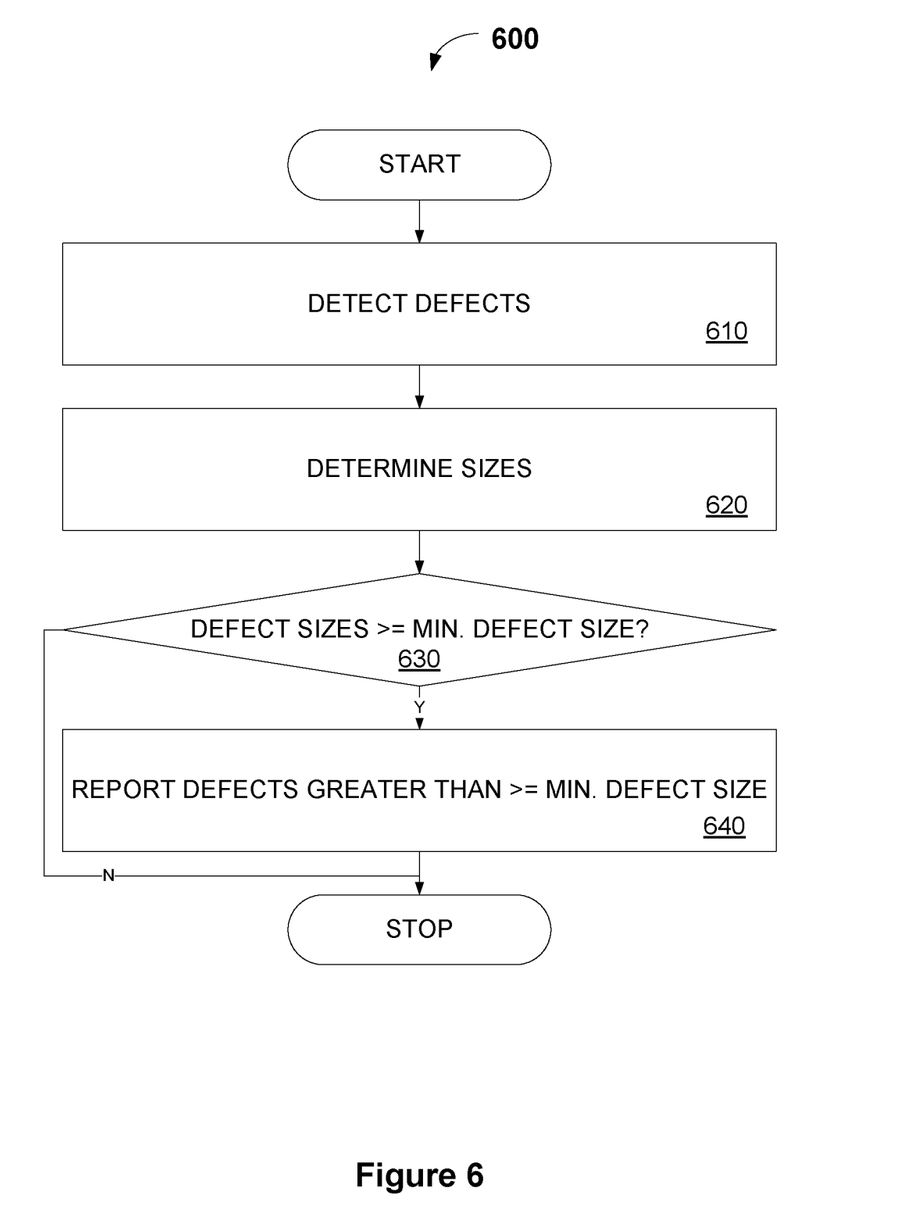
FIG. 6 is a flow diagram illustrating one embodiment of a method for analyzing print data.

FIG. 6 is a flow diagram illustrating one embodiment of a process 600 for analyzing print data. Process 600 may be performed by processing logic that may comprise hardware (e.g., circuitry, dedicated logic, programmable logic, etc.), software (such as instructions run on a processing device), or a combination thereof. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where one or more defects in a page are detected in the print verification data. At processing block 620, the sizes of the defects are detected by comparing each defect size to regions in the mapping data. At decision block 630, a determination is made as to whether the size of each defect is greater than or equal to a respective minimum defect size threshold associated with a location. Defects greater than or equal to the minimum defect size threshold are reported, processing block 640. Otherwise, defects less than the respective minimum defect size thresholds are ignored.

The above-described PVS provides automatic review of defects and presents reviewers only with defects most likely to require rejection of a printed product, which eliminates waste by reducing rejections of products with insignificant defects. Additionally, there is a reduced probability of defective products shipped to end users since the likelihood of reviewers constantly passing defects out of habit because so many are insignificant is reduced. Thus, defect-free products may be printed, finished, and packaged without human intervention.

Figure 7:
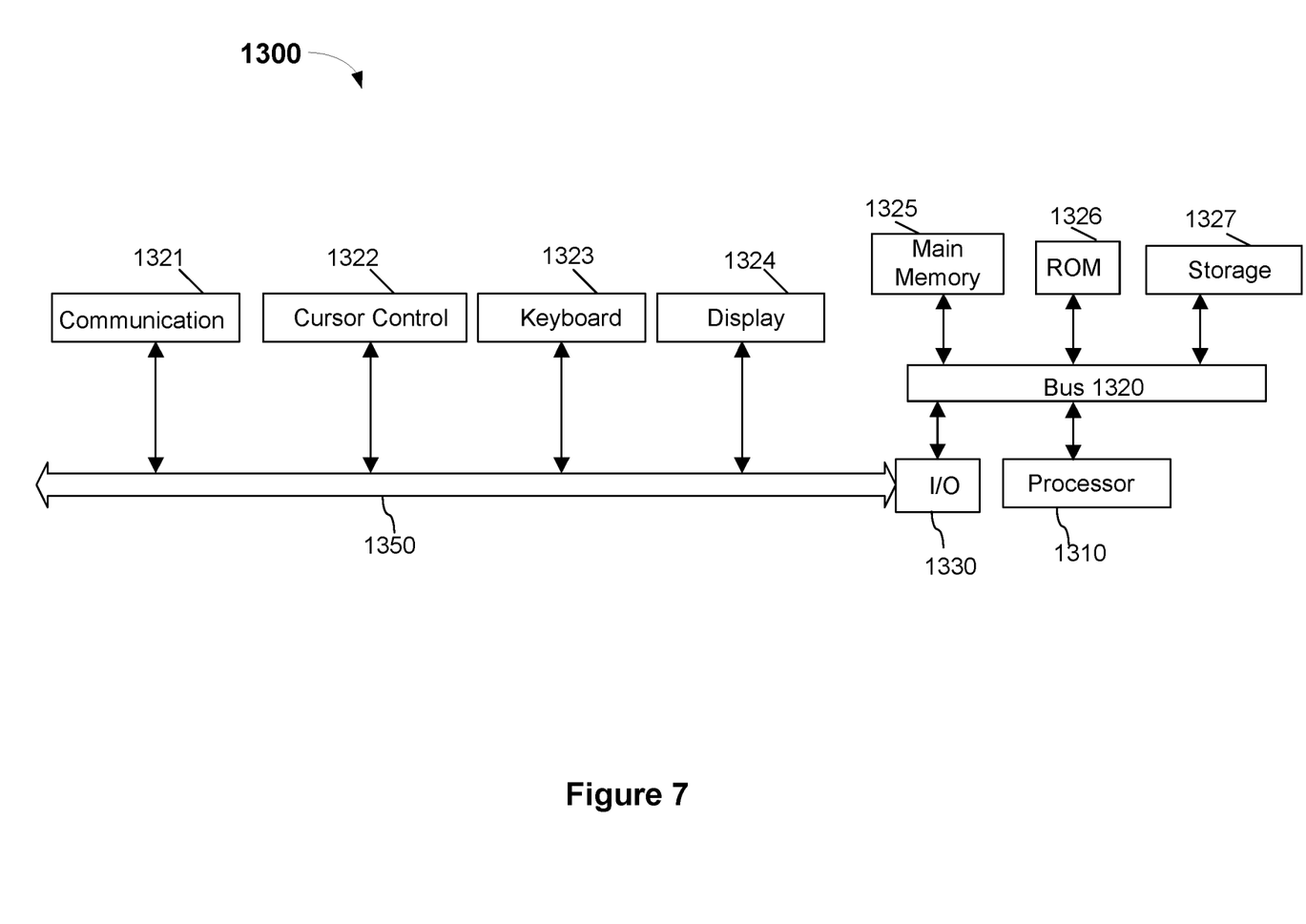
FIG. 7 illustrates one embodiment of a computer system.

FIG. 7 illustrates a computer system 1300 on which printing host 110, printing system 130, print controller 140 and/or PVS 190 may be implemented. Computer system 1300 includes a system bus 1320 for communicating information, and a processor 1310 coupled to bus 1320 for processing information.

Computer system 1300 further comprises a random access memory (RAM) or other dynamic storage device 1325 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
a print controller including one or more processors to receive print data, rasterize the print data into bitmap data, analyze objects in each page of bitmap data to determine sizes of objects and generate mapping data for each page of bitmap data that maps locations of page bitmap data having same size objects;
a print engine to print the bitmap data to a medium; and
a print verification system to capture one or more images of the medium as print verification data, detect one or more defects in the print verification data and determine a size of each of the one or more defects, including determining a location of the defect using the mapping data and determining whether a defect size is greater than or equal to a minimum defect size threshold associated with the location.

2. The system of claim 1, wherein the print verification system detects the one or more defects by comparing the print verification data to each page of the bitmap data.

3. The system of claim 1, wherein the print verification system reports the defect upon a determination that the defect has a size that is greater than or equal to a minimum defect size threshold associated with the location.

4. The system of claim 1, wherein the mapping data comprises a mapping of each object to one of a plurality of size regions having a minimum defect size.

5. The system of claim 4, wherein small objects are mapped to a first size region, medium objects are mapped to a second size region and large objects are mapped to a third size region.

6. At least one non-transitory computer readable medium having instructions stored thereon, which when executed by one or more processors, cause the processors to:
capture one or more images of a print medium as print verification data;
detect one or more defects in the print verification data by comparing the print verification data to one or more pages of bitmap data; and
determine a size of the one or more defects, including:
determining a location of the defect using the mapping data; and
determining whether a defect size is greater than or equal to a minimum defect size threshold associated with the location.

7. The computer readable medium of claim 6, having instructions stored thereon, which when executed by the one or more processors, further cause the processors to report the defect upon a determination that the size of the defect is greater than or equal to a minimum defect size threshold associated with the location.

8. The computer readable medium of claim 6, wherein the mapping data comprises a mapping of each object in a page of print data to one of a plurality of size regions having a minimum defect size.

9. The computer readable medium of claim 8, wherein small objects are mapped to a first size region, medium objects are mapped to a second size region and large objects are mapped to a third size region.

10. The computer readable medium of claim 6, having instructions stored thereon, which when executed by the one or more processors, further cause the processors to: receive print data; and rasterize the print data to generate the one or more pages of bitmap data.

11. The computer readable medium of claim 10, having instructions stored thereon, which when executed by the one or more processors, further cause the processors to print the bitmap data to the print medium.

12. The computer readable medium of claim 11, having instructions stored thereon, which when executed by the one or more processors, further cause the processors to generate the mapping data.

13. A system comprising:
- at least one image capture device to capture one or more images of the medium as print verification data and to detect one or more defects in the print verification data; and
- one or more processors to detect one or more defects in the print verification data by comparing the print verification data to one or more pages of bitmap data and determine a size of the one or more defects, including determining a location of the defect using the mapping data and determining whether a defect size is greater than or equal to a minimum defect size threshold associated with the location.

14. The system of claim 13, wherein the one or more processors report the defect upon a determination that the size of the defect is greater than or equal to a minimum defect size threshold associated with the location.

15. The system of claim 14, wherein the mapping data comprises a mapping of each object in a page of print data to one of a plurality of size regions having a minimum defect size.

16. The system of claim 15, wherein small objects are mapped to a first size region, medium objects are mapped to a second size region and large objects are mapped to a third size region.

17. A printing system comprising:
- a print controller including one or more processors configured to receive print data and transmit the print data in a format that can be used by a print engine;
- a print engine, coupled to the print controller to receive the print data in a format implemented by the print engine, to print the print data to a medium; and
- a print verification system configured to capture one or more images on the medium as print verification data, to detect defects in the print verification data and to determine a size of the one or more defects a size of the one or more defects, including determining a location of the defect using the mapping data and determining whether a defect size is greater than or equal to a minimum defect size threshold associated with the location.

\* \* \* \* \*